United States Patent
Testanero et al.

(10) Patent No.: US 9,998,181 B1
(45) Date of Patent: Jun. 12, 2018

(54) METHOD, SYSTEM AND APPARATUS FOR SELECTIVELY ACCESSING CONTENT AT A DEVICE

(71) Applicant: Cellotape, Inc., Fremont, CA (US)

(72) Inventors: Nick Testanero, Torrington, CT (US); Larry Tadashi Ino, Santa Clara, CA (US)

(73) Assignee: Cellotape, Inc., Fremont, CA (US)

( * ) Notice: Subject to any disclaimer, the term of this patent is extended or adjusted under 35 U.S.C. 154(b) by 57 days.

(21) Appl. No.: 14/801,604

(22) Filed: Jul. 16, 2015

Related U.S. Application Data

(60) Provisional application No. 62/145,419, filed on Apr. 9, 2015.

(51) Int. Cl.
 *H04B 5/00* (2006.01)

(52) U.S. Cl.
 CPC .................. *H04B 5/0062* (2013.01)

(58) Field of Classification Search
 CPC ........... H04B 5/0062; G06K 19/07309; G06K 19/07318; G06K 19/07327; G06K 19/07336; G06K 19/07345; G06K 19/07354; G06K 19/07363; G06K 19/07372; G06K 19/07381; G06K 19/0739; G06K 7/0008; G06K 7/10316
 See application file for complete search history.

(56) References Cited

U.S. PATENT DOCUMENTS

| | | |
|---|---|---|
| 8,522,977 B1 | 9/2013 | Britt, Jr. |
| 2006/0017573 A1 | 1/2006 | Noguchi |
| 2007/0034686 A1 | 2/2007 | Davis et al. |
| 2008/0238610 A1 | 10/2008 | Rosenberg |
| 2008/0316033 A1 | 12/2008 | Yoo et al. |
| 2010/0019482 A1 | 1/2010 | Kumagai et al. |
| 2011/0070828 A1 | 3/2011 | Griffin et al. |
| 2011/0070837 A1* | 3/2011 | Griffin ................ H04B 5/0062 455/41.3 |
| 2012/0075072 A1 | 3/2012 | Pappu |
| 2013/0140358 A1 | 6/2013 | Graef et al. |
| 2013/0215467 A1* | 8/2013 | Fein ..................... G06F 3/1204 358/1.15 |

(Continued)

OTHER PUBLICATIONS

Compucorp, Compucorp & Monroe 300-Series Portable Calculators, 1999, http://www.classiccmp.org/calcmuseum/compucorp-_portable.htm, 12 pages.

(Continued)

*Primary Examiner* — Hirdepal Singh
(74) *Attorney, Agent, or Firm* — Waller Lansden Dortch & Davis, LLP; Matthew C. Cox

(57) ABSTRACT

A method, a system and an apparatus is configured for selectively accessing content at a device. A disabled NFC tag is attached to an electronic device capable of reading the NFC tag. While the NFC tag is disabled, the electronic device is able to read any other additional NFC tag as normal. When the disabled NFC tag is activated it is read by the electronic device and transmits stored data to the electronic device. In some embodiments, the NFC tag is activated by completing a circuit of the NFC tag. In some embodiments, the circuit is completed by depressing a button.

19 Claims, 4 Drawing Sheets

(56) References Cited

U.S. PATENT DOCUMENTS

| | | | |
|---|---|---|---|
| 2014/0113549 A1* | 4/2014 | Beg | H04W 4/12 455/41.1 |
| 2014/0134946 A1* | 5/2014 | Testanero | H04B 5/0062 455/41.1 |
| 2015/0077232 A1* | 3/2015 | Grant | G07C 9/00309 340/13.24 |
| 2015/0155917 A1* | 6/2015 | Won | H04M 1/7253 455/41.1 |
| 2015/0189505 A1* | 7/2015 | Marien | H04L 63/0838 380/270 |
| 2015/0245385 A1* | 8/2015 | Nambord | H04B 5/0031 455/41.1 |
| 2015/0269802 A1* | 9/2015 | Acosta-Cazaubon | G06Q 50/26 705/12 |
| 2016/0028446 A1* | 1/2016 | Moon | H04W 4/008 455/41.1 |
| 2016/0125209 A1* | 5/2016 | Meyers | H04W 4/008 340/10.1 |
| 2016/0188925 A1* | 6/2016 | Liu | G06K 19/073 340/10.34 |
| 2017/0093463 A1* | 3/2017 | Wang | H04B 5/0037 |
| 2017/0118178 A1* | 4/2017 | Fruehling | H04L 63/0428 |

OTHER PUBLICATIONS

Final Office Action dated Dec. 9, 2014, for U.S. Appl. No. 13/830,108, filed Mar. 14, 2013, Inventor: Nick Testanero, 10 Pages.

Non-Final Office Action dated Sep. 18, 2014, for U.S. Appl. No. 13/830,108, filed Mar. 14, 2013, Inventor: Nick Testanero, 13 Pages.

Office Action dated Apr. 1, 2015, for U.S. Appl. No. 13/673,674, filed Nov. 9, 2012, Inventor: Nick Testanero, 18 Pages.

* cited by examiner

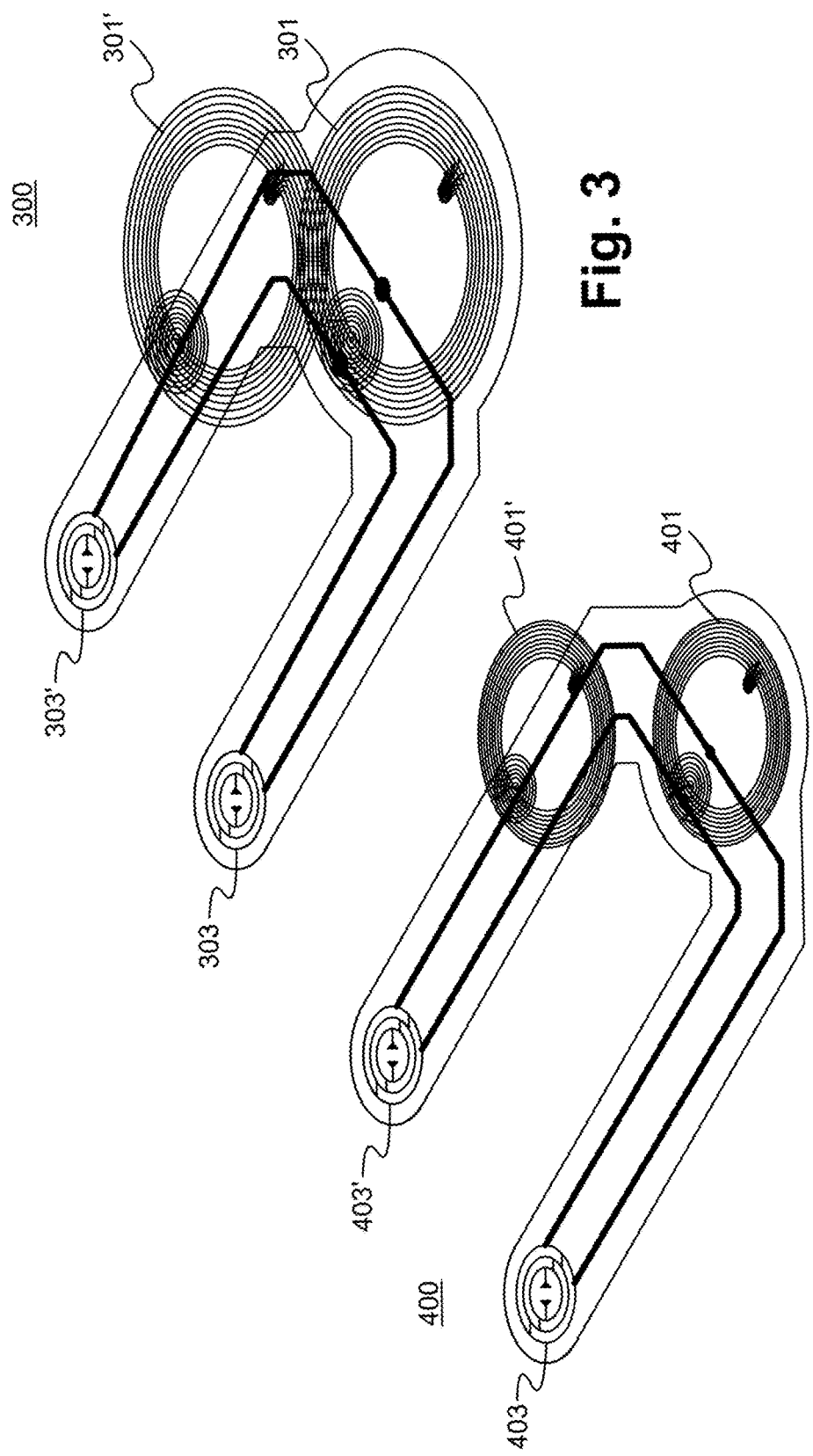

US 9,998,181 B1

METHOD, SYSTEM AND APPARATUS FOR SELECTIVELY ACCESSING CONTENT AT A DEVICE

RELATED APPLICATIONS

This Patent Application claims priority under 35 U.S.C. 119(e) of the U.S. provisional patent application, Application No. 62/145,419, filed on Apr. 9, 2015, and entitled "ON-DEMAND NFC TAG", which is hereby incorporated in its entirety by reference.

FIELD OF THE INVENTION

The present invention is generally directed to the field of near field communication (NFC) and NFC tags. More specifically, the present invention is directed to a method, system and apparatus for selectively accessing digital content at a device.

BACKGROUND OF THE INVENTION

Many devices include a "reader" for NFC tags. Such devices include cell phones, tablet computers, and so-called phablets (phone-tablets). NFC tags include an antenna, which is activated by the reader and produces a signal that interacts with the antenna.

In certain circumstances, an NFC tag can be affixed over the reader with an adhesive either to the outside of the device housing or to the inside of a case that is mounted to the device. Such circumstances can occur when the user of the device wants to have repeatable and ready access to the information stored on that NFC tag with the device. Unfortunately, whenever the NFC tag is mounted over the reader, the device is unable to read any other NFC tag.

SUMMARY OF THE INVENTION

An activatable NFC tag is disabled and prevented from transmitting information until the tag is activated by a user. Particularly, the NFC tag is mounted within an assembly where a circuit of the tag is interrupted until the circuit is completed and the tag is activated by the user. For example, in some embodiments, a button is depressed by the user in order to complete the circuit of the tag, at which time the NFC tag can be read by an NFC reader of an electronic device.

In one aspect, a selectively activatable electronic apparatus comprises an NFC tag body and a NFC tag embedded within the tag body, wherein the NFC tag is unreadable until the NFC tag is activated by a user. In some embodiments, the NFC is activated when a circuit of the NFC tag is completed. The circuit can be completed by depressing a button. Particularly, the apparatus can be attached to an electronic device. The electronic device is able to read one or more additional NFC tags while the NFC tag is disabled. In some embodiments, an adhesive is used for attaching the apparatus to an electronic device. Alternatively, the apparatus is embedded within a cover of the electronic device.

In another aspect, an electronic system comprises a disabled NFC tag and a button for activating the NFC tag, wherein when the NFC tag is activated it is able to transmit information to an NFC reader. In some embodiments, pushing the button completes a circuit of the NFC tag. The system can be attached to an electronic device. The electronic device is able to read one or more additional NFC tags while the NFC tag is disabled. In some embodiments, an adhesive is used for attaching the system to an electronic device. Alternatively the system is embedded within a cover of the electronic device. In some embodiments, the system comprises one or more additional disabled NFC tags. The one or more additional NFC tags can be activated by depressing one or more additional buttons.

In a further aspect, a method of selectively reading an NFC tag, comprises attaching a disabled NFC tag in an operational position to an NFC tag reader and activating the NFC tag in order to transmit data to the NFC tag reader. In some embodiments, the disabled NFC tag is attached to the NFC tag reader with an adhesive. Alternatively, the disabled NFC tag is attached to a cover of the NFC tag reader. In some embodiments, the NFC tag is blank. However, the NFC tag can be pre-programmed with information before it is attached to the NFC tag reader.

In still a further aspect, a method of selectively reading a plurality of NFC tags comprises attaching a first disabled NFC tag to an NFC tag reader, tapping a second active NFC tag with the NFC tag reader in order to transmit data from the second NFC tag to the electronic device; and activating the first NFC tag, wherein when first NFC tag is activated it transmits data to the NFC tag reader. The NFC tag reader is able to read one or more additional NFC tags while the first NFC tag is disabled. In some embodiments, the first NFC tag is attached to the NFC tag reader with an adhesive. Alternatively, the first NFC tag is embedded within a cover of the NFC tag reader.

BRIEF DESCRIPTION OF THE FIGURES

FIG. 3 illustrates an exploded view of an activatable NFC tag in accordance with some embodiments.

FIG. 4 illustrates an exploded view of an activatable NFC tag in accordance with some embodiments.

DETAILED DESCRIPTION OF THE EMBODIMENTS

Embodiments of the invention are directed to a method, a system and an apparatus for accessing content at a device. A disabled NFC tag is attached to an electronic device capable of reading the NFC tag. While the NFC tag is disabled, the electronic device is able to read any other additional NFC tag as normal. When the disabled NFC tag is activated it is read by the electronic device and transmits stored data to the electronic device. In some embodiments, the NFC tag is activated by completing a circuit of the NFC tag. In some embodiments, the circuit is completed by depressing a button.

Reference will now be made in detail to implementations of a method, system, and apparatus for selectively accessing content at a device as described below and as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
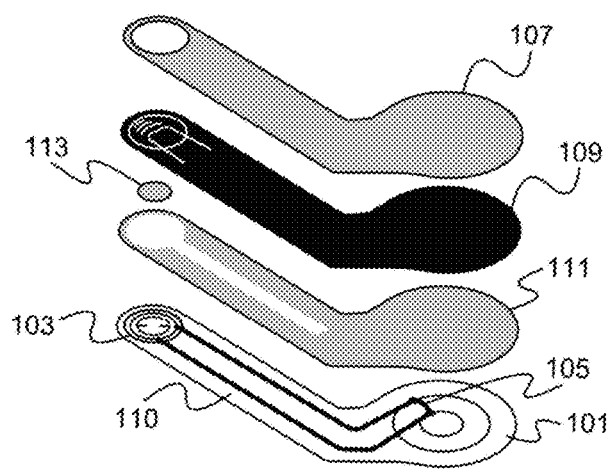
FIG. 1A illustrates an exploded view of an activatable NFC tag in accordance with some embodiments.

Referring now to FIG. 1A, an exploded view of an activatable NFC tag is depicted therein. The NFC tag is disabled from transmitting information to an electronic device until it is activated by a user. The NFC tag 100 comprises an adhesive 107 for coupling with an NFC reader such as an electronic device and/or a case of the electronic device, a graphic overlay 109, a pad 113, such as a silver pad, and a spacer 111. The NFC tag 100 further comprises a circuit 101 for activating the NFC tag and a switch 103 for completing a connection 105 of the circuit 101 and activating the circuit 101. In some embodiments, when the circuit 101 is activated the NFC tag 100 can transmit data to the electronic device. Particularly, the connection 105 is not completed until the switch 103 is depressed. Consequently, the NFC tag 100 remains disabled until switch 103 is depressed, at which time the circuit 101 is completed and NFC tag is capable of transmitting data to the electronic device.

Figure 1B:
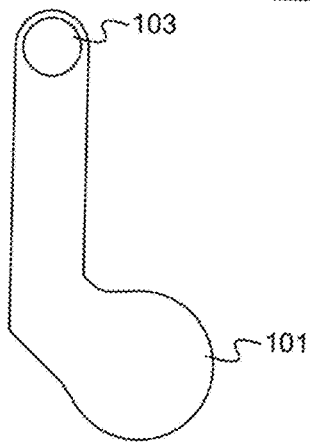
FIG. 1B illustrates an activatable NFC tag in accordance with some embodiments.

As shown within FIG. 1A, the NFC tag 100 comprises an adhesive 107, a graphic overlay 109, a pad 113, a spacer 111, the tag body 110 and switch 103, however, the NFC tag 100 can comprise any number of appropriate components. As shown within FIG. 1B, in some embodiments, the tag 100 comprises a circus NFC tag. As described above, the switch and/or button 103 is depressed in order to complete the circuit 101 so that the NFC tag can transmit data to an electronic device. FIG. 1B illustrates example dimensions of the NFC tag of FIG. 1A. However, the tag can be sized in order to meet any appropriately desired application.

Figure 2A:
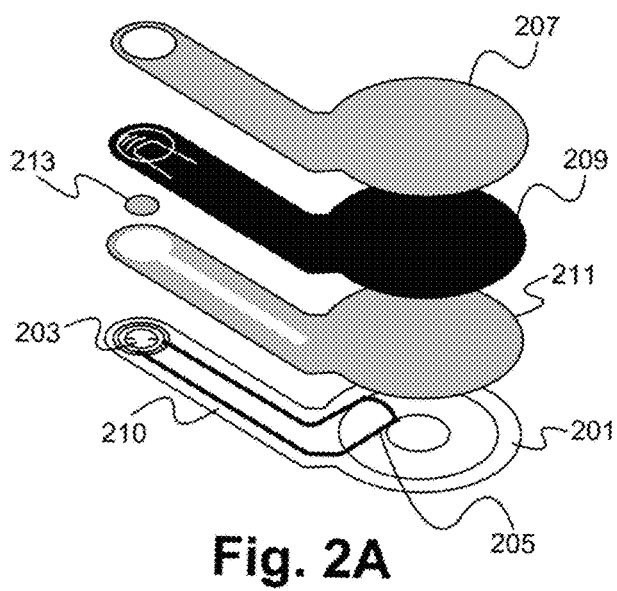
FIG. 2A illustrates an exploded view of an activatable NFC tag in accordance with some embodiments.

FIG. 2A illustrates an exploded view of an NFC tag in accordance with further embodiments. As described above in relation to FIG. 1, the NFC tag 200 is disabled from transmitting information to an electronic device until it is activated by a user. The NFC tag 200 comprises an adhesive 207 for coupling with an NFC reader such as an electronic device and/or a case of the electronic device, a graphic overlay 209, a pad 213, such as a silver pad, and a spacer 211. The NFC tag 200 further comprises a circuit 201 for activating the NFC tag and a switch 203 for completing a connection 205 of the circuit 201 and activating the circuit 201. In some embodiments, when the circuit 201 is activated the NFC tag 200 can transmit data to the electronic device. Particularly, the connection 205 is not completed until the switch 203 is depressed. Consequently, the NFC tag 200 remains disabled until switch 203 is depressed, at which time the circuit 201 is completed and NFC tag is capable of transmitting data to the electronic device.

Figure 2B:
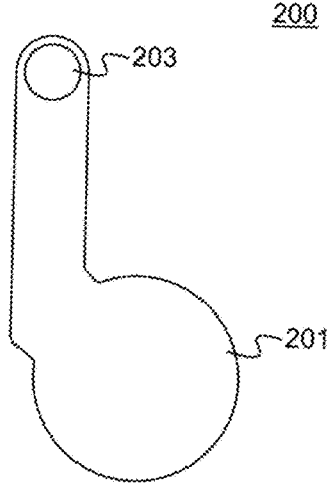
FIG. 2B illustrates an activatable NFC tag in accordance with some embodiments.

As shown within FIG. 2A, the NFC tag 200 comprises an adhesive 207, a graphic overlay 209, a pad 213, a spacer 211, the tag body 210 and switch 203, however, the NFC tag 200 can comprise any number of appropriate components. As shown within FIG. 2B, in some embodiments, the tag 200 comprises a bullseye NFC tag. As described above, the switch and/or button 203 is depressed in order to complete the circuit 201 so that the NFC tag can transmit data to an electronic device. FIG. 2B illustrates example dimensions of the NFC tag of FIG. 2A. However, the tag can be sized in order to meet any appropriately desired application.

As shown in FIG. 3, in some embodiments, an electronic system can comprise a plurality of activatable NFC tags. As described above, the NFC tags are disabled from transmitting information to an electronic device until it is activated by a user. The NFC tag 300 comprises a plurality of tags and buttons for selectively activating the plurality of tags.

The NFC tag 300 is similar to the NFC tags as described above and comprises an adhesive for coupling with an NFC reader such as an electronic device and/or a case of the electronic device, a graphic overlay, a pad, such as a silver pad, and a spacer. As shown within FIG. 3, the NFC tag 300 comprises a plurality of NFC circuits 301 and 301'. Each circuit 301 and 301' is configured to transmit different information. In some embodiments, the circuit 301 is completed when to button 313 is depressed and the circuit 301' is completed when the button 313' is depressed. When each circuit 301 and 301' is activated the NFC tag can transmit data to the electronic device. Particularly, a connection is not completed until the switch is depressed. Consequently, the NFC tag 300 remains disabled until switch is depressed, at which time the circuit is completed and NFC tag is capable of transmitting data to the electronic device. As further shown in FIG. 3, the circuits 301 and 301' are embedded within a bullseye shaped NFC tag. Additionally, although two circuits 301 and 301' are shown. The NFC tag can comprise any appropriately desired number of NFC circuits.

As shown in FIG. 4, in some embodiments, an electronic system can comprise a plurality of activatable NFC tags. As described above, the NFC tags are disabled from transmitting information to an electronic device until it is activated by a user. The NFC tag 400 comprises a plurality of tags and buttons for selectively activating the plurality of tags.

The NFC tag 400 is similar to the NFC tags as described above and comprises an adhesive for coupling with an NFC reader such as an electronic device and/or a case of the electronic device, a graphic overlay, a pad, such as a silver pad, and a spacer. As shown within FIG. 4, the NFC tag 400 comprises a plurality of NFC circuits 401 and 401'. Each circuit 401 and 401' is configured to transmit different information. In some embodiments, the circuit 401 is completed when to button 413 is depressed and the circuit 401' is completed when the button 413' is depressed. When each circuit 401 and 401' is activated the NFC tag can transmit data to the electronic device. Particularly, a connection is not completed until the switch is depressed. Consequently, the NFC tag 400 remains disabled until switch is depressed, at which time the circuit is completed and NFC tag is capable of transmitting data to the electronic device. As further shown in FIG. 4, the circuits 401 and 401' are embedded within a circus shaped NFC tag. Additionally, although two circuits 401 and 401' are shown. The NFC tag can comprise any appropriately desired number of NFC circuits.

Figure 5:
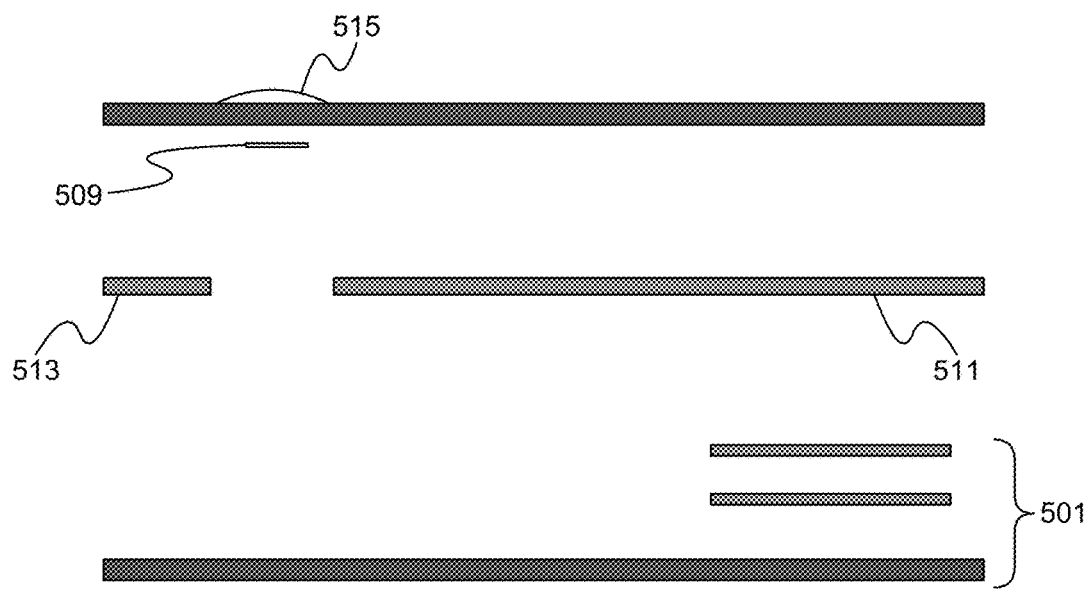
FIG. 5 illustrates a side view of an activatable NFC tag in accordance with some embodiments.

FIG. 5 illustrates a side view of an activatable NFC tag in accordance with some embodiments. The NFC tag 500 comprises an adhesive 507, a pad 509, such as a silver pad, a spacer 511, and one or more NFC circuits 501. As described above, when a switch is depressed, the one or more circuits 501 are completed and the NFC tag can transmit data to an electronic device. As shown within FIG. 5, in some embodiments, the switch for completing the one or more circuits 501 comprises an embossed keypad 515.

Figure 6:
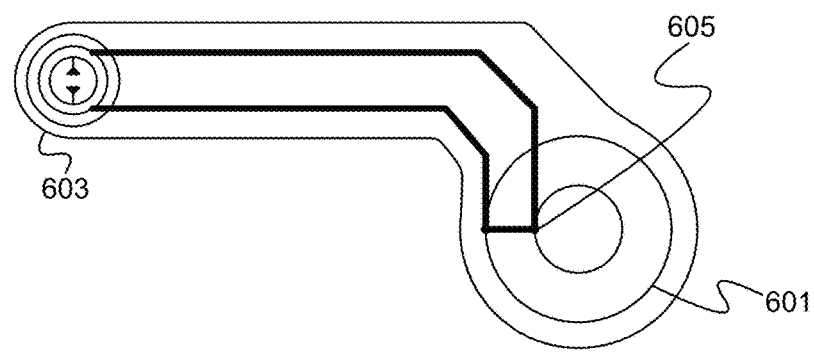
FIG. 6 illustrates an activatable NFC tag in accordance with some embodiments.

FIG. 6 illustrates an assembled activatable NFC tag in accordance with some embodiments. As shown within FIG. 6, the NFC tag 600 is disabled until the button 603 is depressed completing a connection 605 of the circuit 601 and activating the circuit 601. In some embodiments, the NFC tag 600 can be attached to an electronic device. Until the button 603 is depressed, the electronic device is able to read any other NFC tag that is closely positioned or tapped against the electronic device. Conversely, when the button is depressed, the electronic device can interact with the NFC tag 600 and cannot read any other NFC tag. Particularly, the NFC tag 600 can be appropriately affixed and/or coupled in order interact with any appropriate NFC reader and/or electronic device.

Figure 7:
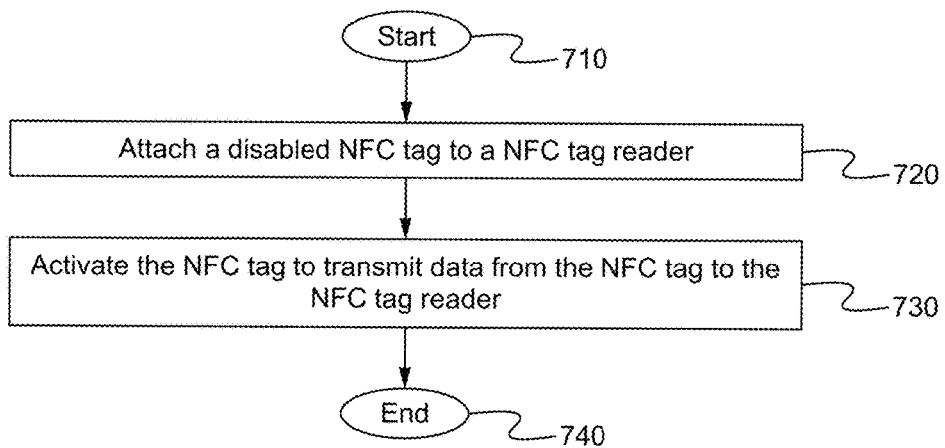
FIG. 7 illustrates a method of selectively reading an NFC tag in accordance with some embodiments.

FIG. 7 illustrates a method of selectively reading an NFC tag in accordance with some embodiments. The method begins in the step 710. In the step 720, a disabled NFC tag is attached to an electronic device and/or an NFC tag reader. In some embodiments, the NFC is attached to the electronic device with an adhesive. Alternatively, in some embodiments, the NFC tag is embedded within a cover of the electronic device. Particularly, the cover can be removably coupled with the electronic device in order to protect the electronic device and/or for cosmetic reasons. Then, in the step 730, the NFC tag is activated. When the NFC tag is activated, it transmits data to the electronic device. In some embodiments, the NFC tag is pre-programmed before it is coupled with the electronic device. Alternatively, in some embodiments, the NFC tag can be programmed after it is coupled with the electronic device. The method ends in the step 740.

Figure 8:
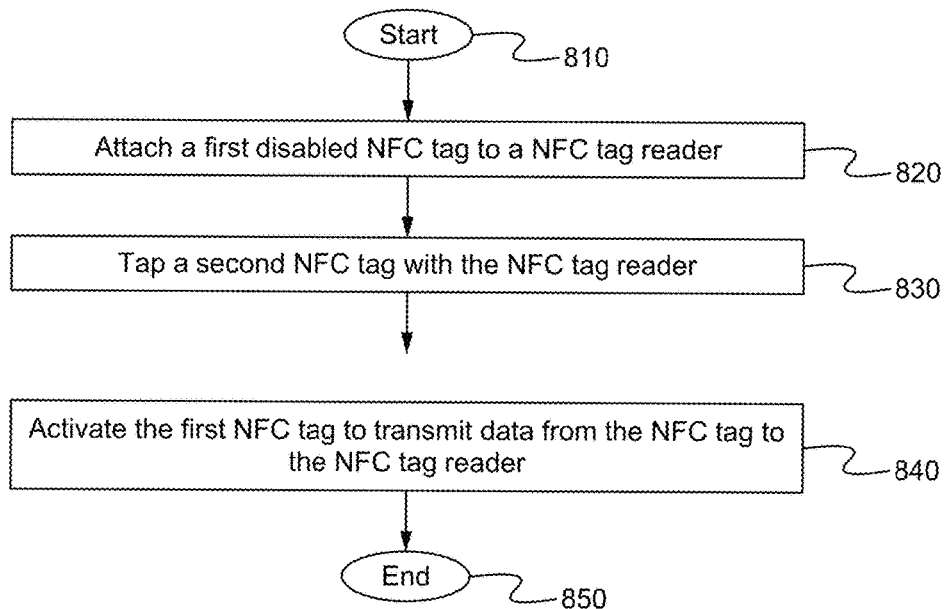
FIG. 8 illustrates a method of selectively reading a plurality of NFC tags in accordance with some embodiments.

FIG. 8 illustrates a method of selectively reading a plurality of NFC tags. The method begins in the step 810. In the step 820, a first disabled NFC tag is coupled with an electronic device and/or NFC reader. In some embodiments, the NFC is attached to the electronic device with an adhesive. Alternatively, in some embodiments, the NFC tag is embedded within a cover of the electronic device. Particularly, the cover can be removably coupled with the electronic device in order to protect the electronic device and/or for cosmetic reasons. In the step 830, a second NFC tag is place near and/or tapped against the electronic device such that data is transmitted from the second NFC tag to the electronic device. In the step 840, the first NFC tag is activated so that it is capable of transmitting data to the electronic device. As described above, in some embodiments, the NFC is activated when a circuit of the NFC tag is completed. In some embodiments, the circuit is completed by depressing a button. Particularly, the electronic device and/or NFC reader can read one or more additional NFC tags while the first NFC tag is disabled. The method ends in the step 850.

In operation, a selectively activatable NFC tag is attached to an electronic device capable of reading the NFC tag. While the NFC tag is disabled, the electronic device is able to read any other NFC tag as normal. Activating the disabled NFC tag enables it to be read by the electronic device and/or NFC reader. Consequently, an NFC tag containing convenient or repeatably accessible information can be stored near the electronic device while still allowing the electronic device to access information stored on other NFC tags. Particularly, the present invention allows a user to maintain ready access to information of an often accessed NFC tag while still being able to access information on other NFC tags. Accordingly, the present invention as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A selectively activatable electronic apparatus attached to an electronic device, the apparatus comprising:
   a NFC tag body; and
   a NFC tag embedded within the tag body, wherein the NFC tag comprises a plurality of NFC circuits configured to transmit different information, wherein the plurality of NFC circuits are disabled until activated by a user, wherein the electronic device is able to read one or more additional NFC tags while the plurality of NFC circuits are disabled.

2. The electronic apparatus of claim 1, wherein the plurality of NFC circuits are separately activated when the plurality of circuits are separately completed.

3. The electronic apparatus of claim 2, wherein the plurality of circuits are completed by depressing a button.

4. The electronic apparatus of claim 1, comprising an adhesive for attaching the apparatus to the electronic device.

5. The electronic apparatus of claim 1, wherein the apparatus is embedded within a cover of the electronic device.

6. An electronic system attached to an electronic device, the system comprising:
   a NFC tag comprising a first disabled NFC circuit and a second disabled NFC circuit, wherein the first NFC circuit and the second NFC circuit are configured to transmit different information;
   a first button for activating the first NFC circuit, wherein when the first NFC circuit is activated it is able to transmit information; and
   a second button for activating the second NFC circuit, wherein when the second NFC circuit is activated it is able to transmit information, wherein the electronic device is able to read one or more additional NFC tags while the first NFC circuit and the second NFC circuit are disabled.

7. The electronic system of claim 6, comprising an adhesive for attaching the system to the electronic device.

8. The electronic system of claim 6, wherein the system is embedded within a cover of the electronic device.

9. The electronic system of claim 6, further comprising one or more additional disabled NFC tags.

10. The electronic system of claim 9, wherein the one or more additional NFC tags are activated by depressing one or more additional buttons.

11. A method of selectively reading an NFC tag, comprising:
   attaching a NFC tag to an NFC tag reader wherein the NFC tag comprises a first NFC circuit and a second NFC circuit, wherein the first NFC circuit and the second NFC circuit are configured to transmit different information and are disabled until activated; and
   activating one of the first NFC circuit and the second NFC circuit in order to transmit data to the NFC tag reader wherein the tag reader is able to read one or more additional NFC tags while the first NFC circuit and the second NFC circuit are disabled.

12. The method of claim 11, wherein the NFC tag is attached to the NFC tag reader with an adhesive.

13. The method of claim 11, wherein the NFC tag is attached to a cover of the NFC tag reader.

14. The method of claim 11, wherein the NFC tag is blank.

15. The method of claim 11, wherein the NFC tag is pre-programmed with information before it is attached to the NFC tag reader.

16. A method of selectively reading a plurality of NFC tags, the method comprising:

attaching a first NFC tag to an NFC tag reader wherein the first NFC tag comprises a first NFC circuit configurable in an unactivated state and an activated state and a second NFC circuit configurable in a disabled state and an activated state, wherein the first NFC circuit and the second NFC circuit are configured to transmit different information;

activating one of the first NFC circuit and the second NFC circuit, wherein when one of the first NFC circuit and the second NFC circuit are activated it transmits data to the NFC tag reader and prevents a second NFC tag from transmitting data to the NFC tag reader;

disabling the one of the first NFC circuit and the second NFC circuit, wherein disabling allows the NFC tag reader to access the second NFC tag; and tapping the second NFC tag with the NFC tag reader in order to transmit data from the second NFC tag to the NFC tag reader.

17. The method of claim 16, wherein the NFC tag reader is able to read one or more additional NFC tags while the first NFC circuit and the second NFC circuit are disabled.

18. The method of claim 16, wherein the first NFC tag is attached to the NFC tag reader with an adhesive.

19. The method of claim 16, wherein the first NFC tag is embedded within a cover of the NFC tag reader.

* * * * *